United States Patent [19]

Ogasawara

[11] Patent Number: 4,772,909
[45] Date of Patent: Sep. 20, 1988

[54] LENS DRIVE CONTROL APPARATUS FOR AUTOMATIC FOCUSING

[75] Inventor: Akira Ogasawara, Kawasaki, Japan

[73] Assignee: Nippon Kogaku K. K., Tokyo, Japan

[21] Appl. No.: 29,225

[22] Filed: Mar. 23, 1987

[30] Foreign Application Priority Data

Mar. 27, 1986 [JP] Japan .................................. 61-69194
Mar. 28, 1986 [JP] Japan .................................. 61-70526

[51] Int. Cl.$^4$ ................................................ G03B 3/00
[52] U.S. Cl. .................................... 354/400; 354/402; 354/286
[58] Field of Search ...................... 354/400, 402, 286

[56] References Cited

U.S. PATENT DOCUMENTS

| | | | |
|---|---|---|---|
| 4,460,257 | 7/1984 | Ogasawara | 354/402 |
| 4,477,167 | 10/1984 | Ishikawa et al. | 354/400 |
| 4,482,235 | 11/1984 | Yasukawa et al. | 354/402 |
| 4,483,603 | 11/1984 | Metabi et al. | 354/402 |
| 4,496,229 | 1/1985 | Ogasawara | 354/400 |
| 4,509,842 | 4/1985 | Taniguchi et al. | 354/286 |
| 4,550,994 | 11/1985 | Maruyama | 354/402 |
| 4,613,224 | 9/1986 | Ogasawara | 354/402 |

*Primary Examiner*—Russell E. Adams
*Attorney, Agent, or Firm*—Shapiro and Shapiro

[57] ABSTRACT

In an automatic focusing apparatus, wherein first zone representing an in-focus condition and a second zone for sufficiently assuring detection precision of the automatic focusing apparatus are provided for the position of a focusing lens, the focusing lens is driven on the basis of a defocus amount when the defocus amount falls within the range between the first and second zones, and thereafter an in-focus signal is output upon driving of the focusing lens, thereby shortening a delay time from the end of driving of the photographing lens to generation of the in-focus signal.

15 Claims, 5 Drawing Sheets

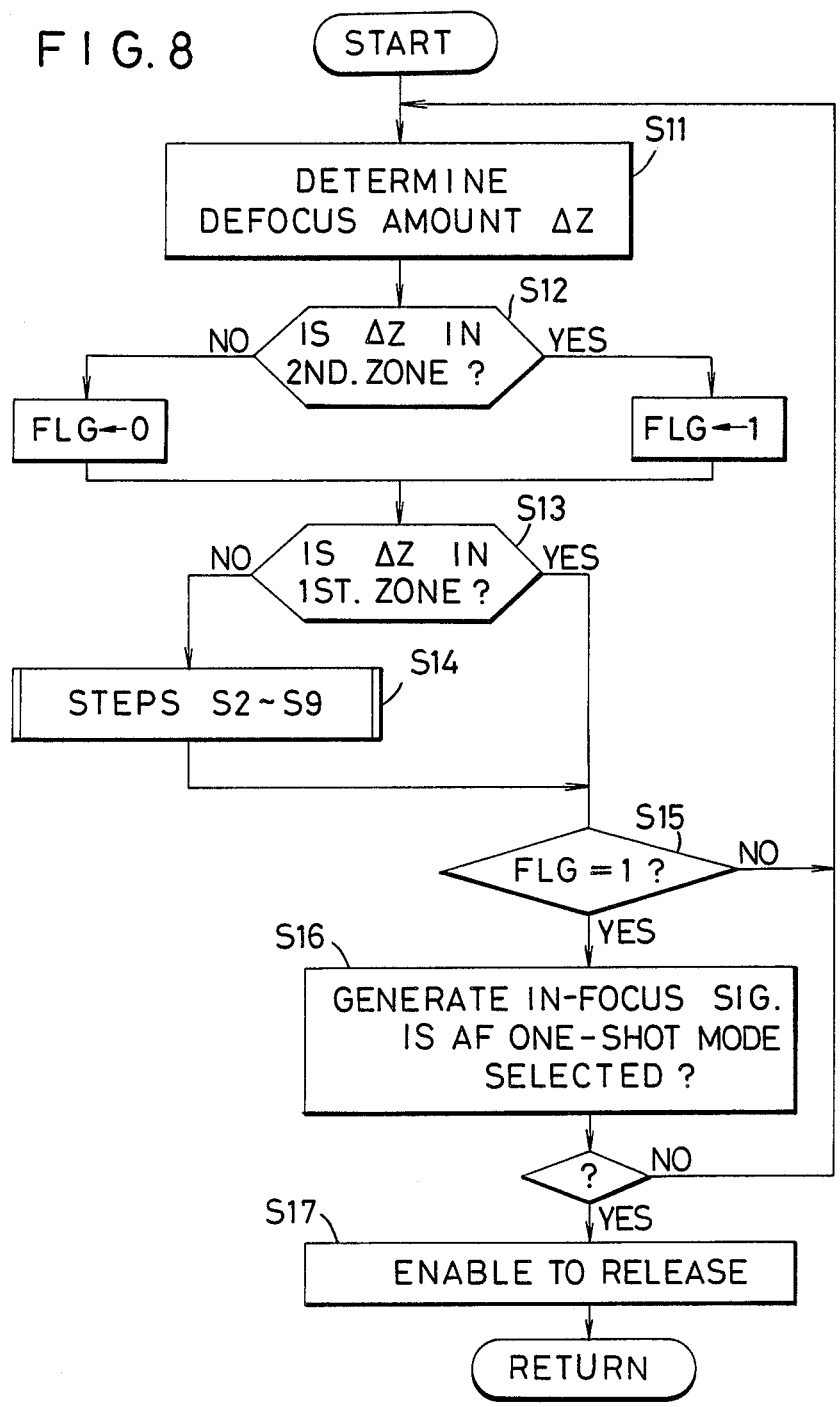

LENS DRIVE CONTROL APPARATUS FOR AUTOMATIC FOCUSING

BACKGROUND OF THE INVENTION

1. Field of the Invention

The present invention relates to drive control for an objective lens in an automatic focusing apparatus.

2. Related Background Art

U.S. Pat. Nos. 4,238,143 and 4,451,729 describe apparatuses wherein a moving speed of a focusing lens in an objective lens is controlled for focusing and the moving speed is reduced when the lens is moved to a position near the just focus position of an object.

Conventional automatic focusing cameras can employ photographing lenses having focal lengths of several tens of millimeters to several hundreds of millimeters. A photographing lens having a long focal length requires a large torque of a drive unit for driving the lens. However, a photographing lens having a short focal length requires a small torque of the drive unit. For this reason, it is undesirable to use a single drive control method for all photographing lenses. For example, when a lens requiring a large drive torque is attached to a camera having a drive control system for controlling energization of a motor so as to prevent the lens having a small drive torque from overrunning from a servo target (just focus position), the drive speed is decreased too early, so as to prolong time required for driving the lens to the servo target. As a result, the response characteristics of the drive unit are degraded.

In another known conventional automatic focusing apparatus, a focusing lens is driven by a motor on the basis of a defocus amount. The next focusing detection cycle is performed during or after driving of the focusing lens by the motor to obtain another defocus amount, and this defocus amount is then used for the next focusing detection cycle. The focusing lens is stopped when the defocus amount is regarded to fall within the predetermined range of in-focus values. Focusing detection cycles are continuously repeated in the above conventional apparatus. For example, one of the camera photographing modes is a so-called one-shot auto focus mode wherein a shutter release request is allowed only after an in-focus signal is generated by the automatic focusing apparatus. In this automatic focusing apparatus, the focusing detection operation prior to generation of the in-focus signal is performed to check only the focusing state. In an automatic focusing apparatus using a charge storage type element (e.g., a CCD) as a light-receiving element, charge storage time of the light-receiving element upon stopping of the photographing lens and processing time of an auto focus algorithm constitute delay time until the shutter release request is accepted. As a result, the response characteristics of the automatic focusing apparatus are degraded.

SUMMARY OF THE INVENTION

It is an object of the present invention to provide an automatic focusing apparatus having a short response time in control for driving a photographing lens.

It is another object of the present invention to provide an automatic focusing apparatus for optimizing drive time required for driving a plurality of photographing lenses having different focal lengths to just focus positions, wherein a response time can be shortened.

It is still another object of the present invention to provide an automatic focusing apparatus wherein focusing load characteristics of the photographing lens are detected to change the lens drive torque according to the load characteristics.

It is still another object of the present invention to provide an automatic focusing apparatus wherein a first zone representing an in-focus condition and a second zone for sufficiently assuring detection precision of the automatic focusing apparatus are provided for the position of a focusing lens, the focusing lens is driven on the basis of a defocus amount when the defocus amount falls within the range between the first and second zones, and thereafter an in-focus signal is output upon driving of the focusing lens, thereby shortening a delay time from the end of driving of the photographing lens to generation of the in-focus signal.

BRIEF DESCRIPTION OF THE DRAWINGS

FIG. 8 is a flow chart for explaining operation of the driver.

DESCRIPTION OF THE PREFERRED EMBODIMENTS

A beam passing through a photographing lens 1 including a focusing lens operated in response to an automatic focusing apparatus is focused on a light-receiving portion, e.g., a charge storage type light-receiving element such as a CCD 2 in the automatic focusing apparatus built into a camera body to generate an image signal. The image signal is sent to a CPU 4 through an interface 3. The image signal is converted into a digital signal by the interface 3, and the digital signal is sent to the CPU 4. Alternatively, the image signal is directly converted into a digital signal by an A/D converter built into the CPU 4. The digital image signal is processed by a predetermined auto focus algorithm under the control of the CPU 4. An expected shift amount (to be referred to as a defocus amount hereinafter) of the focusing lens which is required to obtain the in-focus state is calculated. The detailed optical detection system and the algorithm are known to those skilled in the art, and a detailed description thereof will be omitted.

Figure 1:
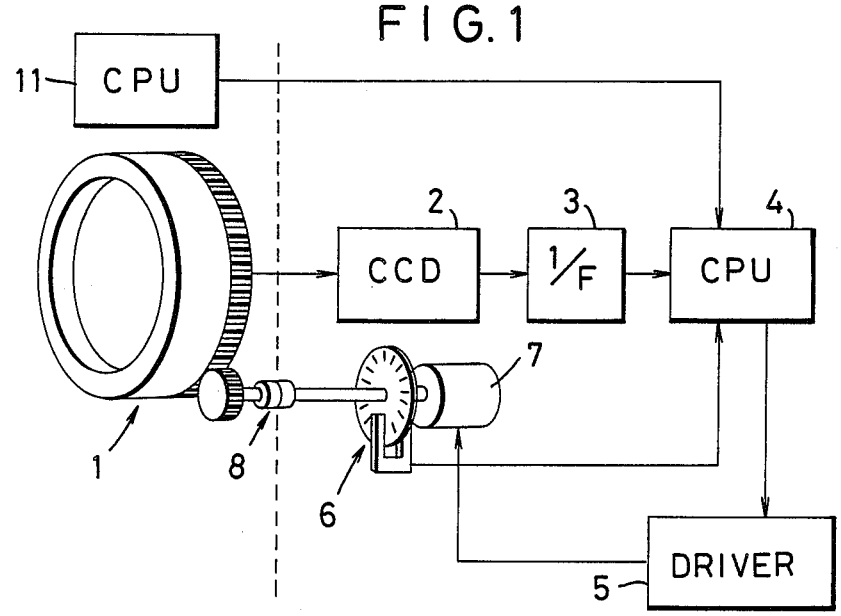
FIG. 1 is a schematic view showing an automatic focusing apparatus according to an embodiment of the present invention.
Figure 2:
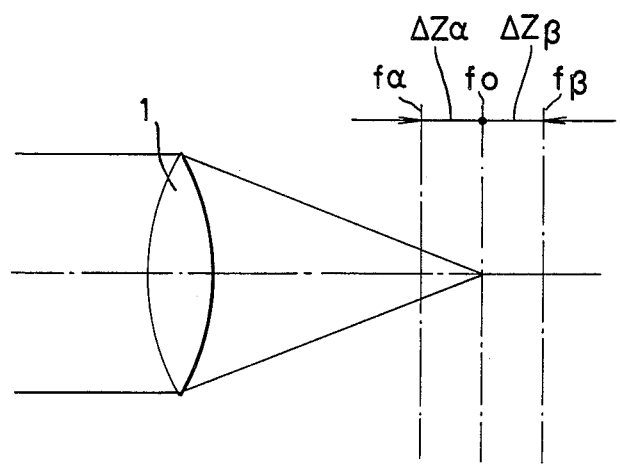
FIG. 2 is a view for explaining a focusing state of a photographing lens.

As shown in FIG. 2, the defocus amount detected by the automatic focusing apparatus corresponds to a relative distance $\Delta Z$ between a focusing position of the beam passing thorugh the photographing lens 1 and the photosensitive film surface. If the focusing plane of the photographing lens coincides with the film surface f0, the in-focus state is obtained. The CCD 2 in the automatic focusing apparatus is located at a position substantially equivalent to the film surface. An optical image on the CCD 2 is sent to the CPU 4 through the interface 3, and calculations for focusing detection are performed to calculate the defocus amount $\Delta Z$. In order to form an optical image on the film surface, the focusing lens must be driven back-and-forth an amount corresponding to a defocus amount $\Delta Z\alpha$ obtained when the focusing plane is located at a position $f\alpha$ or a defocus amount $\Delta Z\beta$ obtained when the focusing plane is located at a position $f\beta$.

The shift amount of the focusing lens is represented by feedback pulses from an encoder 6 including a photointerrupter mounted on an output shaft of a drive motor 7. The CPU 4 controls rotation of the motor 7 and through the driver 5 while monitoring the actual shift amount of the focusing lens. A motor speed signal is sent from the camera body to the photographing lens 1 through a coupler 8. The motor 7 drives the focusing lens to the just focus position through a gear train. The defocus amount $\Delta Z$ calculated by the CPU 4 is calculated as a count of feedback pulses in practice.

Figure 3:
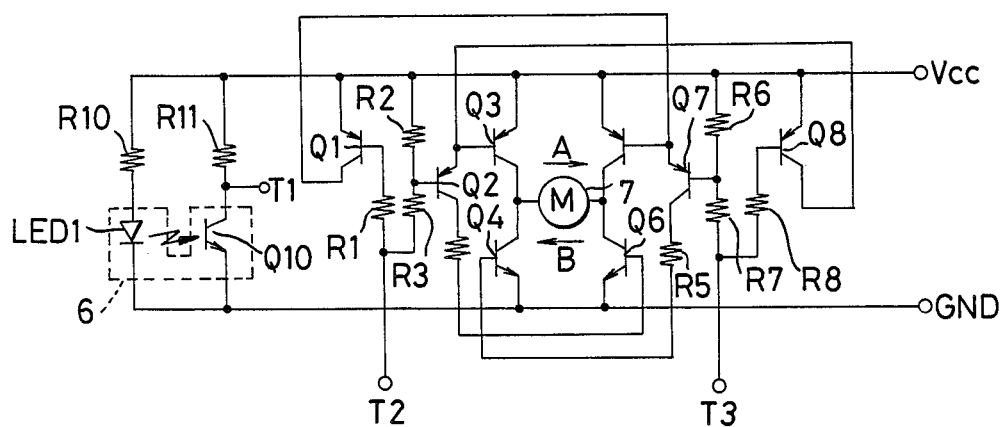
FIG. 3 is a circuit diagram of a driver shown in FIG. 1.

FIG. 3 is a circuit diagram of the driver 5.

H and L level digital signals are supplied as control signals to control terminals T2 and T3, respectively. Upon reception of these control signals, transistors Q3 to Q6 constituting a bridge circuit for controlling a current supplied to the motor 7 are selectively turned on/off. The L level signal of the control signals corresponds to a voltage of a ground terminal GND, and the H level signal corresponds to a voltage exceeding a voltage at a power source terminal Vcc.

When the terminals T2 and T3 are simultaneously set at H level, an H level voltage is applied to the bases of pnp transistors Q1 and Q2 through resistors R1 to R3 and the bases of pnp transistors Q7 and Q8 through resistors R6 to R8. All the pnp transistors Q1, Q2, Q7 and Q8 are turned off. The pnp transistors Q3 and Q5 and the npn transistors Q4 and Q6, all of which constitute a bridge circuit, are turned off. In this case, the motor 7 is not energized and is kept stopped. A current consumed by the circuit is zero, and the servo wait condition is maintained.

When an L level control signal is supplied to the terminal T2 and an H level control signal is supplied to the terminal T3, a current is supplied to the base of the transistor Q2 through the resistor R3 and the transistor Q2 is turned on. Upon ON operation of the transistor Q2, the transistors Q3 and Q6 are turned on to supply a current to the motor 7 in a direction indicated by arrow A, thereby driving the motor 7. Since the transistor Q7 is kept OFF, the transistors Q4, Q5, and Q8 are rendered nonconductive. In this case, the transistor Q1 is turned on, and the transistors Q5 and Q7 are turned off. As a result, the circuit operation is not adversely affected.

When an H level control signal and an L level control signal are supplied to the terminals T2 and T3, respectively, the circuit operation is opposite to that described above. A current is supplied in a direction indicated by arrow B, and the motor 7 is rotated in the reverse direction.

When L level control signals are simultaneously supplied to the terminals T2 and T3, the transistors Q2 and Q7 are turned on. At the same time, the transistors Q1 and Q8 are turned on. A total emitter current of the transistor Q7 is supplied from the transistor Q1. Similarly, a total emitter current of the transistor Q2 is supplied from the transistor Q8. Saturated voltages VCE of the transistors Q1 and Q8 are respectively lower than voltages VBE required for turning on the transistors Q5 and Q3. The transistors Q3 and Q5 are turned off, and only the transistors Q4 and Q6 are turned on. A loop consisting of the transistors Q4 and Q6 serves to brake the motor 7 during the operation.

The encoder 6 includes a light-emitting diode LED1 and a phototransistor Q10. The actual shift amount of the focusing lens is monitored by the encoder 6 and is supplied as feedback pulses from the terminal T1 to the CPU 4.

The above description has been concerned with a static control mode. However, near the servo target (i.e., the just focus position), the motor speed is reduced to properly effect braking when the focusing lens reaches the servo target. For this purpose, the following dynamic control is performed.

Figure 4:
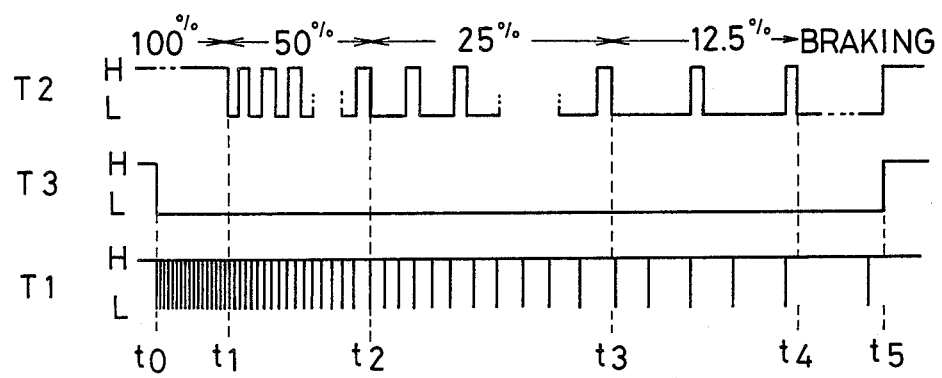
FIG. 4 is a timing chart showing changes in levels of voltages appearing at terminals T1 to T3 in the driver shown in FIG. 3.

FIG. 4 shows the control signals for driving the focusing lens reaching the servo target. When the driver 5 is operated under the control of the CPU 4, the drive control signal is input to the control terminal T2. The L level signal is input to the control terminal T3 during the operation of the motor 7. The driver 5 stepwisely reduces the duty ratio of the drive signal supplied to the servo motor 7 when the focusing lens is driven by the servo motor 7 from time t0 toward the servo target, and the braking characteristics are improved. During intermittent driving, the driver 5 alternately drives and brakes the focusing lens so as to control the drive torque. However, braking may be replaced with deenergization of the motor 7. In the driver 5, the duty ratios, i.e., the energization times of the motor, are changed in four steps, i.e., 100% (from time t0 to time t1), 50% (from time t1 to time t2), 25% (from time t2 to time t3), and 12.5% (from time t3 to time t4). The deceleration to the servo target position can be smoothly performed, and the servo time can be minimized.

When the duty ratio of the control signal input to the control terminal T2 of the driver 5 is reduced, the drive speed of the photographing lens 1 is decreased and the period of the feedback pulse signal output from the terminal T1 is prolonged. The CPU 4 monitors the feedback pulses and gradually decreases the duty ratio of the control signal when the focusing lens comes close to the servo target.

The torque required for driving the focusing lens, i.e., the duty ratio (FIG. 4) of the control signal is changed at different timings according to the type of photographing lens attached to the camera. Since the photographing lenses attached to the camera have different torques according to their types, drive control must be performed according to the drive torque characteristics. For this reason, the CPU 4 in the camera body reads out the drive torque characteristic of the photographing lens as a lens discrimination signal from the ROM in a one-chip CPU 11. The switching timing of the driver 5 is determined in response to the discrimination signal. A positional difference between the current position of the focusing lens and the servo target is calculated by the CPU 4 according to the number of pulses. The number of monitored pulses is subtracted from the number of calculated pulses. Whenenver the difference between the number of monitored pulses and the number of calculated pulses reaches a predetermined number of pulses, the switching timing of the duty ratio is determined to provide an optimal duty ratio.

Figure 5:
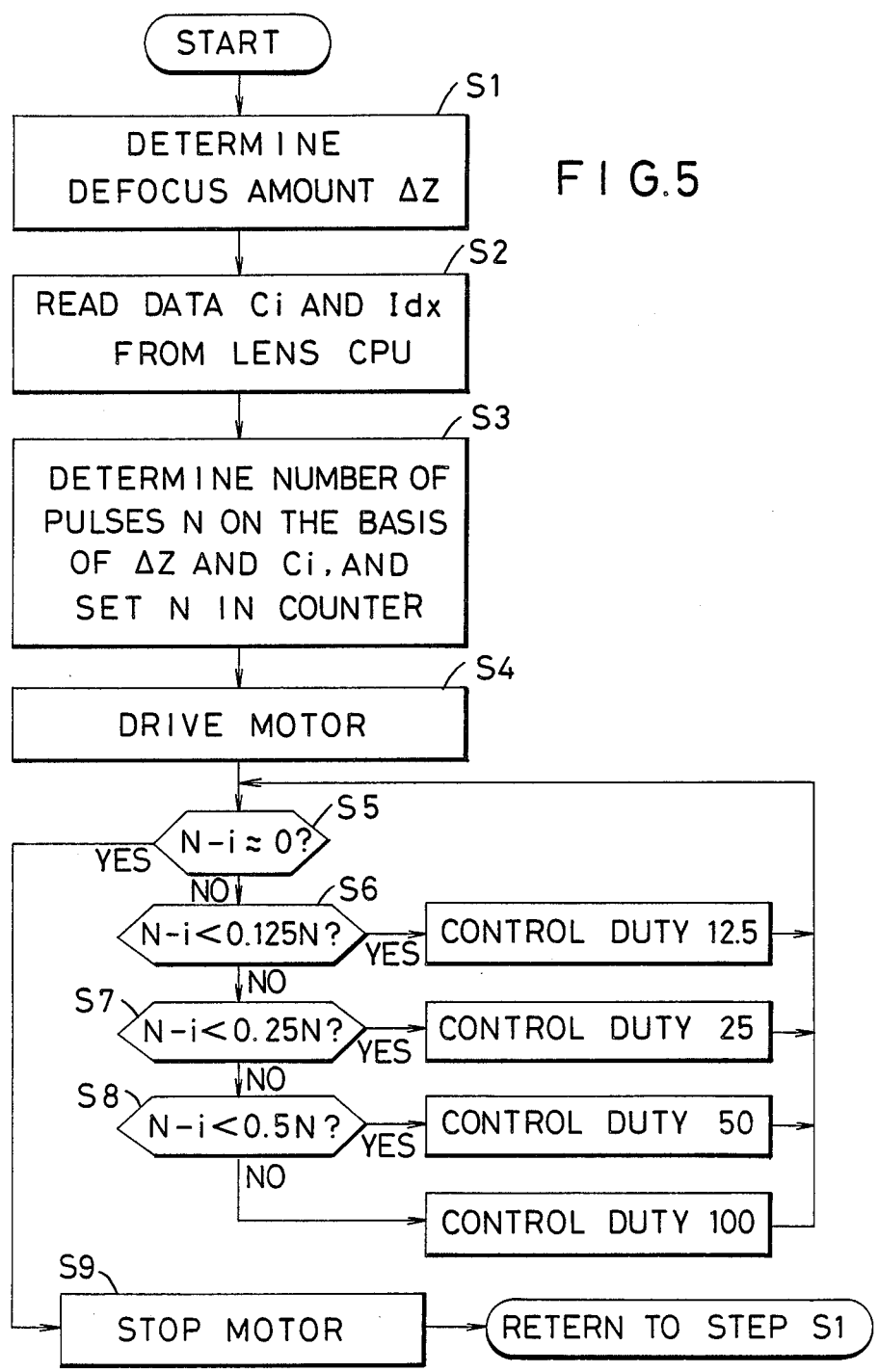
FIG. 5 is a flow chart for explaining control of the driver shown in FIG. 3.

FIG. 5 is a flow chart showing detailed control of the driver 5 under the control of the CPU 4.

In step S1, the charge storage amount of the CCD is converted into a digital signal, and a deviation of the focusing plane from the film surface, i.e., the defocus amount ΔZ is determined. The drive torque characteristics of the lens and imaging plane shift coefficients Ci for converting the feedback pulses from the photographing lens into an imaging plane shift amount on the camera film surface are stored in the ROM in the CPU 11 in the photographing lens. In step S2, the CPU 4 reads out the imaging plane shift coefficient Ci and the drive torque characteristics (a torque index Idx hereinafter) of the focusing lens from the ROM. In step S3, the number N of pulses corresponding to the lens shift amount up to the servo target position is calculated on the basis of the imaging plane shift coefficient Ci and the defocus amount Δx determined in step S1. The number N is set in the down counter in the CPU 4.

In step S4, the CPU 4 controls the driver 5 to drive the focusing lens. Feedback pulses are input to the counter according to the shift amount of the focusing lens. The number i of feedback pulses is subtracted from the number N of preset pulses. Meanwhile, the CPU 4 always monitors the count of the counter. The CPU 4 determines in step S5 whether a count N-i of the counter reaches zero. If NO in step S5, the CPU 4 determines in steps S6, S7, and S8 whether the present count reaches the first to third predetermined values determined on the basis of the torque index Idx. More specifically, the CPU 4 determines in step S6 whether the number N of pulses determined in step S3 is smaller than a value corresponding to the duty ratio of 12.5%. The CPU 4 determines in steps S7 and S8 whether the number N of pulses is smaller than values corresponding to the duty ratios of 25% and 50%. In the initial drive period of the motor, steps S6, S7, and S8 are determined to be NO. The CPU 4 sets the duty ratio of the control signal to be 100%.

When the focusing gradually comes close to the servo target position, the duty ratio of the control signal is decreased in an order of 50%, 25%, and 12.5%, thereby smoothly decelerating the focusing lens up to the servo target position. In step S9, the CPU 4 supplies L level signals to the terminals T2 and T3 for a predetermined period of time, and the motor 7 is stopped. The distance measuring cycle is started again.

The numbers of pulses for determining the switching timings of the duty ratios are summarized in units of torque indices of the photographing lens. In order to easily process the torque indices by software in FIG. 5, the torque indices are represented by integers 0, 1, 2, . . . n.

| Torque Index | Duty Ratio (%) | | |
|---|---|---|---|
| | 50 | 25 | 12.5 |
| 0 | P01 | P02 | P03 |
| 1 | P11 | P12 | P13 |
| 2 | P21 | P22 | P23 |
| ... | ... | ... | ... |
| ... | ... | ... | ... |
| ... | ... | ... | ... |
| n | Pn1 | Pn2 | Pn3 |

Data P01, P02, P03, P11, . . . Pn3 represent the numbers of pulses, respectively. These data signals are stored in the ROM in the CPU 4 in the camera according to the memory map of FIG. 6.

For example, when torque index=2 is input from the CPU 11 in the photographing lens 1 to the CPU 4 in the camera, the CPU 4 reads out the data P21 representing the number of pulses at time t1 as the timing for switching the duty ratio from 100% to 50%. Similarly, the CPU 4 reads out the data P22 and P23 representing the numbers of pulses at times t2 and t3 as the timings for switching the duty ratios from 50% to 25% and from 25% to 12.5%, respectively.

Figure 6:
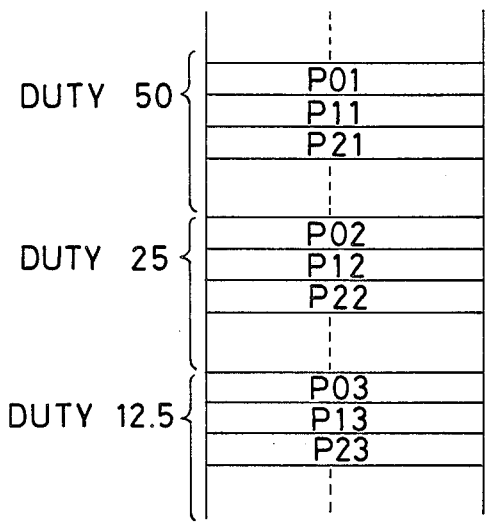
FIG. 6 is a memory map of data stored in a ROM in a CPU.

Referring to FIG. 6, data signals representing the number of pulses are grouped in units of duty ratios and are stored in the ROM. The number of pulses at the duty ratio switching timing can be referred according to the offset of the torque indices.

The torque indices used in discrimination of the photographing lens may be replaced with, e.g., lens drive power source voltages as parameters. More specifically, when the lens drive torque is high, a higher voltage is required and the required drive voltages differ depending on the types of photographing lens. The different voltages can be used to control the photographing lens. Even if the lens is driven in response to a drive signal having a given duty ratio, a higher voltage causes a higher lens moving speed. When the voltage is relatively low, the duty ratio change timing for the servo target is set at a position corresponding to a smaller number of pulses, thereby improving the response characteristics.

Figure 7:
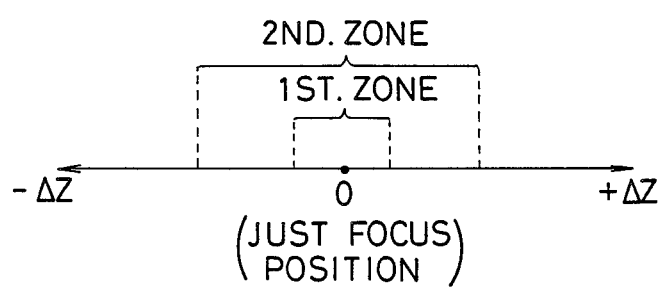
FIG. 7 is a view for explaining the relationship between the defocus amount and the first and second zones.

Accuracy of the defocus amount ΔZ is degraded due to the capacity of the CCD 2 and the optical capacity of the detection optical system including the photographing lens 1 when the defocus amount ΔZ is increased. In this embodiment, there are provided a first zone where the defocus amount is sufficiently small and the photographing lens can be discriminated to be set substantially in an in-focus state and a second zone which is larger than the first zone and which allows expectation of detection precision in the automatic focusing apparatus, as shown in FIG. 7, thereby compensating for degradation of precision.

When the defocus amount ΔZ falls within the first zone, the focusing lens is not driven and the in-focus signal is output.

When the defocus amount ΔZ falls outside the first zone but within the second zone, the focusing lens is driven on the basis of the defocus amount ΔZ. Upon completion of driving, the in-focus signal is immediately output.

The in-focus signal is output from the CPU 4 upon stopping of the focusing lens. The in-focus signal is used as a signal for allowing exposure control such as shutter release operation. In this manner, two in-focus discrimination zones are provided to eliminate response delay in focal point re-detection for checking the focusing state and in processing according to an auto focus algorithm.

It should be noted that if the defocus amount ΔZ falls outside the second zone, the focusing lens is driven on the basis of the defocus amount, and focal point detection is performed again to obtain a defocus amount.

Automatic focusing operation on the basis of the first and second zones is shown in FIG. 8.

Upon determination of the defocus amount ΔZ in step S11, the CPU 4 evaluates the defocus amount ΔZ in step S12. If this defocus amount ΔZ falls within the second zone, a flag FLG is set at logic "1". However, if the defocus amount ΔZ falls outside the second zone, the flag FLG is reset to LOGIC "0". After the focusing lens is driven in response to the logic value of the flag, the CPU determines whether driving is performed within the second zone or outside the second zone.

The CPU determines in step S13 whether the defocus amount ΔZ falls within the first zone. If YES in step S13, the flow advances to step S15. Since FLG=1 is established, the in-focus signal is immediately output in step S16.

However, if the CPU determines in step S13 that the defocus amount ΔZ falls outside the first zone, the flow advances to step S14. Drive control in steps S2 to S9 in FIG. 5 is performed. Subsequently, the CPU checks the logic level of the flag FLG in step S15. If FLG=1, then the defocus amount ΔZ is given as a value between the first and second zones and the in-focus signal is immediately output (step S16). However, if FLG=0 in step S15, then the defocus amount ΔZ is larger than a value in the second zone and the in-focus signal is not output. The flow returns to step S11, and focusing detection is performed.

The CPU determines in step S16 whether the camera AF mode is a one-shot auto focus mode (the auto focus mode wherein once the in-focus state is detected, subsequent focusing detection is not performed and the shutter release operation is allowed). If YES in step S16, shutter release operation is immediately performed (step S17). However, if NO in step S16, i.e., if the CPU determines that the auto focus mode is a continuous auto focus mode (the auto focus mode wherein focusing detection is repeatedly performed even after the in-focus state is detected and detection can continuously trace a moving object), the flow returns to step S11 and focusing detection is continuously performed.

According to the above embodiment, the magnitude of the defocus amount ΔZ is considered. If the defocus amount ΔZ is a value falling between the first and second zones, the defocus amount ΔZ is determined to be satisfactorily reliable and the focusing lens is driven on the basis of the defocus amount ΔZ. Upon completion of driving of the focusing lens, the in-focus signal is output. Therefore, focusing detection time for checking the focusing state can be eliminated, and thus high-speed automatic focusing apparatus can be provided.

What is claimed is:

1. An automatic focusing apparatus comprising:
   an electric motor;
   a lens assembly including a focusing optical system and a transmission mechanism arranged between said electric motor and said focusing optical system and driven by said electrical motor so as to move said focusing optical system in a direction of an optical axis of said focusing optical system;
   means for detecting a defocus amount corresponding to a difference between a predetermined focal plane and an imaging plane of an object image formed by said focusing optical system;
   means for supplying power to said electric motor;
   means for generating information corresponding to a magnitude of a load of said electric motor;
   means for determining a drive characteristic of said electric motor on the basis of said defocus amount and said information so that said power supplied to said electric motor is decreased when the imaging plane comes close to a given distance from said predetermined focal plane and so that said given distance is changed when said load of said electric motor has been varied; and
   means for controlling said power supplying means in accordance with said determined drive characteristic.

2. An apparatus according to claim 1, wherein said information represents a torque which is required for driving said transmission mechanism.

3. An apparatus according to claim 1, wherein said given distance is changed to a smaller distance in accordance with decrease of said load of said electric motor.

4. An apparatus according to claim 3, wherein said determining means includes means for prestoring data representing a relation between the intensity of said power and said defocus amount at every load of said electric motor.

5. An apparatus according to claim 4, wherein said supplying means supplies a periodic current to said electric motor, and said data represents a duty ratio of the periodic current.

6. An apparatus according to claim 1, wherein said information generating means is provided on said lens assembly.

7. An apparatus according to claim 6, wherein said information generating means includes memory means for prestoring said information and means for putting out said information toward said determining means.

8. An apparatus according to claim 1, wherein said control means includes means for monitoring a moving amount of said focusing optical system by said electric motor and controls said electric motor in response to said monitoring means.

9. A camera system, comprising:
   a camera housing;
   an electric motor;
   a photographing lens assembly having a focusing optical system being attached to said camera housing, and a transmission mechanism arranged between said electric motor and said focusing optical system and driven by said electric motor so as to move said focusing optical system in a direction of an optical axis of said focusing optical system;
   means for detecting a defocus amount corresponding to a difference between a predetermined focal plane and an imaging plane of an object image formed by said focusing optical system;
   means for supplying power to said electric motor;
   means arranged in said photographing lens assembly for generating information corresponding to a magnitude of a load for said electric motor to move said focusing optical system through said transmission mechanism;
   means for determining a drive characteristic of said electric motor on the basis of said defocus amount and said information so that said power supplied to said electric motor is decreased when the imaging plane comes close to a given distance from said predetermined focal plane and so that said given distance is changed when said load of said electric motor has been varied; and
   means for controlling said power supplying means in accordance with said determined drive characteristic.

10. A system according to claim 9, wherein said information represents a torque which is required for driving said transmission mechanism.

11. A system according to claim 9, wherein said given distance is changed to a smaller distance in accordance with decrease of said load of said electric motor.

12. A system according to claim 9, wherein said supplying means supplies a periodic current to said electric motor, and said control means controls a duty ratio of the periodic current to decrease said power of said motor.

13. A system according to claim 9, wherein said electric motor is arranged in said camera housing, and further comprising means for coupling said electric motor to said transmission mechanism.

14. An automatic focusing apparatus comprising:
a focusing optical system including a focusing lens;
means for detecting a defocus amount and a defocus direction, the defocus amount being adapted to correspond to a different between an imaging plane of an object image formed by said focusing optical system and a predetermined focal plane;
means, in response to said detecting means, for discriminating the position of said imaging plane relative to a first zone including a first distance from the focal plane and a second zone including a second distance longer than the first distance from the focal plane, the first distance being determined such that the focusing optical system substantially focuses on an object when the imaging plane falls within the first zone;
driving means for driving said focusing lens in a direction of an optical axis of said focusing lens;
means for generating an in-focus signal representing that focusing on the object is completed; and
control means for controlling said detecting means, said in-focus signal generating means and said driving means in response to said discriminating means;
when the imaging plane is positioned outside the second zone, said control means causing said driving means to move said focusing lens according to the detected defocus amount and the defocus direction and then immediately causing said detecting means to detect the defocus amount and the defocus direction, and when the imaging plane is positioned outside the first zone and within the second zone, said control means causing said driving means to move said focusing lens according to the detected defocus amount and the defocus direction and then immediately causing said generating means to generate said in-focus signal.

15. An automatic focusing appparatus according to claim 14, wherein said control means causes said generating means to generate said in-focus signal in response to said detecting means when the imaging plane is positioned within the first zone.

* * * * *